(12) United States Patent
Okazaki et al.

(10) Patent No.: US 8,691,361 B2
(45) Date of Patent: Apr. 8, 2014

(54) CERAMIC HONEYCOMB STRUCTURE AND ITS PRODUCTION METHOD

(75) Inventors: Shunji Okazaki, Miyako-gun (JP); Toshitaka Ishizawa, Miyako-gun (JP)

(73) Assignee: Hitachi Metals, Ltd., Tokyo (JP)

( * ) Notice: Subject to any disclaimer, the term of this patent is extended or adjusted under 35 U.S.C. 154(b) by 454 days.

(21) Appl. No.: 13/056,086

(22) PCT Filed: Mar. 18, 2009

(86) PCT No.: PCT/JP2009/055330
§ 371 (c)(1), (2), (4) Date: Jan. 26, 2011

(87) PCT Pub. No.: WO2010/013509
PCT Pub. Date: Feb. 4, 2010

(65) Prior Publication Data
US 2011/0135873 A1 Jun. 9, 2011

(30) Foreign Application Priority Data
Jul. 28, 2008 (JP) ................................. 2008-193671

(51) Int. Cl.
*B32B 3/12* (2006.01)
*F01N 3/022* (2006.01)
*B28B 3/20* (2006.01)
*C04B 35/01* (2006.01)

(52) U.S. Cl.
USPC ............. 428/116; 422/180; 55/523; 264/631

(58) Field of Classification Search
USPC ............. 428/116; 55/522–524; 422/169–172, 422/177–182; 60/297; 264/631
See application file for complete search history.

(56) References Cited

U.S. PATENT DOCUMENTS

| 8,187,353 | B2 * | 5/2012 | Beall et al. | 428/116 |
| 8,283,282 | B2 * | 10/2012 | Noguchi et al. | 428/116 |
| 8,500,840 | B2 * | 8/2013 | Okazaki et al. | 422/180 |
| 2003/0041574 | A1 | 3/2003 | Noguchi et al. | |
| 2003/0093982 | A1 | 5/2003 | Suwabe et al. | |

(Continued)

FOREIGN PATENT DOCUMENTS

| JP | 61-129015 A | 6/1986 |
| JP | 03-284313 A | 12/1991 |

(Continued)

*Primary Examiner* — David Sample
*Assistant Examiner* — Nicholas W Jordan
(74) *Attorney, Agent, or Firm* — Sughrue Mion, PLLC

(57) ABSTRACT

A ceramic honeycomb structure having a large number of flow paths defined by porous cell walls having porosity of 45-68% and an average pore size of 15-35 μm, the volume of pores having diameters of more than 50 μm being more than 10% and 25% or less of the total pore volume, the volume of pores having diameters of 100 μm or more being 1-8% of the total pore volume, the volume of pores having diameters of less than 10 μm being 3-10% of the total pore volume, and the pores having a pore size distribution deviation σ [=log($D_{20}$)−log($D_{80}$)] of 0.45 or less, wherein $D_{20}$ represents a pore size (μm) at a pore volume corresponding to 20% of the total pore volume, and $D_{80}$ represents a pore size (μm) at a pore volume corresponding to 80% of the total pore volume, in a curve showing the relation between a pore size and a cumulative pore volume obtained by accumulating a pore volume from the maximum pore size to a particular pore size, and $D_{80} < D_{20}$.

13 Claims, 5 Drawing Sheets

(56) References Cited

U.S. PATENT DOCUMENTS

| | | | |
|---|---|---|---|
| 2007/0119134 A1 | 5/2007 | Beall et al. | |
| 2007/0293392 A1 | 12/2007 | Ohno et al. | |
| 2008/0124516 A1 | 5/2008 | Noguchi et al. | |
| 2010/0310819 A1* | 12/2010 | Suwabe et al. | 428/116 |

FOREIGN PATENT DOCUMENTS

| | | |
|---|---|---|
| JP | 2002-219319 A | 8/2002 |
| JP | 2004-138308 A | 5/2004 |
| JP | 2004-148308 A | 5/2004 |
| JP | 2004-250324 A | 9/2004 |
| JP | 2004-322082 A | 11/2004 |
| JP | 2004-330118 A | 11/2004 |
| JP | 2005-052750 A | 3/2005 |
| JP | 2005-530616 A | 10/2005 |
| JP | 2007-525612 A | 9/2007 |
| JP | 2007-290951 A | 11/2007 |
| WO | 2004/002608 A1 | 1/2004 |
| WO | 2005/005794 A2 | 1/2005 |
| WO | 2005/090262 A1 | 9/2005 |
| WO | 2005/090263 A1 | 9/2005 |
| WO | 2007/064433 A2 | 6/2007 |

* cited by examiner

50 μm

100 μm

CERAMIC HONEYCOMB STRUCTURE AND ITS PRODUCTION METHOD

FIELD OF THE INVENTION

The present invention relates to a ceramic honeycomb structure used for ceramic honeycomb filters for removing particulate matter from an exhaust gas discharged from diesel engines.

BACKGROUND OF THE INVENTION

Exhaust gases discharged from diesel engines contain PM (particulate matter) mainly composed of SOFs (soluble organic fractions) comprising carbonaceous soot and high-boiling-point hydrocarbons, and the SOFs released into the air are likely to adversely affect human bodies and environment. Accordingly, PM-capturing ceramic honeycomb filters are conventionally mounted in exhaust pipes connected to diesel engines. One example of ceramic honeycomb filters for capturing PM to clean exhaust gases is shown in FIGS. 1(a) and 1(b). The ceramic honeycomb filter 10 comprises a ceramic honeycomb structure comprising porous cell walls 2 defining many outlet-side-sealed flow paths 3 and inlet-side-sealed flow paths 4 and a peripheral wall 1, and upstream-side plugs 6a and downstream-side plugs 6c for alternately sealing the inlet-side end surfaces 8 of the inlet-side-sealed flow paths 4 and the outlet-side end surfaces 9 of the outlet-side-sealed flow paths 3 in a checkerboard pattern.

As shown in FIG. 2, this ceramic honeycomb filter 10 is held in a metal container 12 with support members 14, and longitudinally sandwiched by support members 13a, 13b. The support members 14 are generally formed by a metal mesh and/or a ceramic mat. The ceramic honeycomb filter 10 attached to a diesel engine is subject to mechanical vibration and shock from the engine, the road, etc. via the support members 13a, 13b, 14. Particularly because large ceramic honeycomb filters of more than 200 mm in outer diameter for use in large vehicles or special vehicles are subject to large vibration and shock, they are required to keep enough strength.

Important characteristics among those required for ceramic honeycomb filters are particulate-matter-capturing efficiency, pressure loss, and particulate-matter-capturing time (a time period from the start of capturing to a point reaching a constant pressure loss). Particularly, the capturing efficiency and the pressure loss are in a contradictory relation; the higher capturing efficiency resulting in larger pressure loss and a shorter capturing time, and smaller pressure loss resulting in a longer capturing time and poorer capturing efficiency. To meet these contradictory filtering characteristics, investigation has conventionally been conducted to provide technologies for controlling the porosities, average pore sizes and pore sizes on the cell wall surfaces of ceramic honeycomb structures.

To meet further increased regulations of exhaust gases in recent years, exhaust-gas-cleaning apparatuses comprising both SCR apparatuses for removing NOx and honeycomb filters for removing particulate matter have been investigated, and honeycomb filters are required to have smaller pressure loss than conventional ones. Because ceramic honeycomb filters of more than 200 mm in outer diameter for use in large vehicles or special vehicles do not easily have enough strength to withstand mechanical vibration and shock during use, ceramic honeycomb filters having sufficient strength and pressure loss characteristics cannot be obtained by conventional technologies as shown below.

JP 61-129015 A discloses an exhaust-gas-cleaning filter having large pores having diameters of 40-100 μm, and small pores having diameters of 5-40 μm as many as 5-40 times the large pores on cell wall surfaces, this filter having high capturing efficiency from an early stage of use, and small pressure loss. It is further described that pores in cell walls preferably have an average pore size of more than 15 μm, and a cumulative pore volume of 0.3-0.7 $cm^3/g$. The cumulative pore volume of 0.3-0.7 $cm^3/g$ is converted to porosity of 42.8-63.6% by volume. From a pore size distribution line shown in FIG. 4 of JP 61-129015 A, the honeycomb filters of Examples 1, 2, 5 and 6 have cumulative pore volumes of 0.58 $cm^3/g$ (porosity: 59%), 0.4 $cm^3/g$ (porosity: 50%), 0.7 $cm^3/g$ (porosity: 64%) and 0.3 $cm^3/g$ (porosity: 43%), respectively, and average pore sizes of 40 μm, 35 μm, 44 μm and 15 μm, respectively. The porosity P (% by volume) is determined from the true specific gravity p (2.5 $g/cm^3$) and cumulative pore volume V ($cm^3/g$) of cordierite, by the formula of $P = 100 \times V \times \rho/(1+V \times \rho)$.

However, particularly when used as large filters of more than 200 mm in outer diameter for large vehicles or special vehicles, the honeycomb filters of Examples 1, 2 and 5 of JP 61-129015 A do not have enough strength because of too large average pore sizes or porosity, and the honeycomb filter of Example 6 has insufficient pressure loss characteristics because of too small porosity. Namely, the honeycomb filters of Examples 1, 2, 5 and 6 do not have both small pressure loss and high strength.

JP 2002-219319 A discloses that porous honeycomb filters have high particulate-matter-capturing efficiency without pressure loss increase due to the clogging of pores, when their cell walls have such pores that the volume of pores having diameters of less than 10 μm is 15% or less, the volume of pores having diameters of 10-50 μm is 75% or more, and the volume of pores having diameters of more than 50 μm is 10% or less, based on the total pore volume. However, the pore structure described in JP 2002-219319 A fails to provide sufficient pressure loss characteristics and strength to large ceramic honeycomb filters of more than 200 mm in outer diameter for use in large vehicles or special vehicles.

JP 2004-322082 A discloses a ceramic honeycomb filter wherein the total pore volume is 0.55-0.80 $cm^3/g$ (corresponding to porosity of 59-67%), and the volume of pores of 100 μm or more is 0.02-0.10 $cm^3/g$. The total pore volume range is 59-67%, when converted to porosity by the above formula. However, the pore structure described in JP 2004-322082 A need to be improved on pressure loss characteristics and strength to withstand mechanical vibration and shock during use, particularly for large ceramic honeycomb filters of more than 200 mm in outer diameter for large vehicles or special vehicles.

JP 2005-530616 A discloses a ceramic honeycomb filter, whose pore size distribution provides $[d_{50}/(d_{50}+d_{90})]$ of less than 0.70, and Sf $(=[d_{50}/(d_{50}+d_{90})]/[\text{porosity (\%)}/100])$ of less than 1.55, wherein Sf is a permeability factor when soot is attached to the filter. It describes that such pore size distribution provides smaller pressure loss. However, the pore structure described in JP 2005-530616 A is not satisfactory in both pressure loss characteristics and strength, particularly when used for large ceramic honeycomb filters of more than 200 mm in outer diameter for large vehicles or special vehicles.

JP 2007-525612 A discloses a diesel particulate matter filter having a median diameter $d_{50}$ of less than 25 μm, and pore size distribution and porosity meeting the relation of $P_m \leq 3.75$, wherein $P_m = 10.2474 [1/[(d_{50})^2(\text{porosity (\%)}/100)]] + 0.0366183(d_{90}) - 0.00040119(d_{90})^2 + 0.468815(100/$ porosity (%))$^2$+0.0297715($d_{50}$)+1.61639($d_{50}$−$d_{10}$)/$d_{50}$], wherein $d_{10}$ and $d_{90}$ represent pore sizes at 10% and 90% of the total pore volume in a volume-based cumulative pore size distribution, $d_{10}$<$d_{50}$<$d_{90}$. However, the pore structure described in JP 2007-525612 A does not have sufficient pressure loss characteristics and strength particularly when used for large ceramic honeycomb filters of more than 200 mm in outer diameter for large vehicles or special vehicles.

WO 2005/090263 A discloses a method for producing a porous ceramic body by forming a moldable ceramic material containing porous silica powder or porous silica-containing compound powder into a predetermined shape, and sintering it. It describes that porous silica powder or porous silica-containing compound powder functions as a pore-forming material for controlling the size and amount of pores. However, the silica particles described in WO2005/090263 A have a wide particle size distribution, with many coarse particles even when particles of the optimum median diameter are selected, forming cell walls having large pores. As a result, it does not have enough strength to withstand vibration and shock when mounted on vehicles.

OBJECT OF THE INVENTION

Accordingly, an object of the present invention is to provide a ceramic honeycomb filter suffering small pressure loss and having enough strength in use.

DISCLOSURE OF THE INVENTION

As a result of intense research in view of the above object, the inventors have found that by optimizing the balance between pores effective for smaller pressure loss and pores effective for higher strength, ceramic honeycomb filters suffering smaller pressure loss while keeping enough strength in use can be obtained. The present invention has been completed based on such finding.

Thus, the ceramic honeycomb structure of the present invention has a large number of flow paths defined by porous cell walls having porosity of 45-68% and an average pore size of 15-35 μm; the volume of pores having diameters of more than 50 μm being more than 10% and 25% or less of the total pore volume;

the volume of pores having diameters of 100 μm or more being 1-8% of the total pore volume;

the volume of pores having diameters of less than 10 μm being 3-10% of the total pore volume; and the pores having a pore size distribution deviation σ[=log($D_{20}$)−log($D_{80}$)] of 0.45 or less, wherein $D_{20}$ represents a pore size (μm) at a pore volume corresponding to 20% of the total pore volume, and $D_{80}$ represents a pore size (μm) at a pore volume corresponding to 80% of the total pore volume, in a curve showing the relation between a pore size and a cumulative pore volume obtained by accumulating a pore volume from the maximum pore size to a particular pore size, and $D_{80}$<$D_{20}$.

The porous cell walls preferably have air permeability of $4 \times 10^{-12}$ m$^2$ to $9 \times 10^{-12}$ m$^2$.

The ceramic honeycomb structure of the present invention preferably has isostatic strength of 1 MPa or more.

The porous cell walls preferably have a thickness of 0.2-0.3 mm and a cell density of 23-39 cells/cm$^2$.

The pressure loss is preferably 1.2 kPa or less, when capturing 2 g/liter of soot at a flow rate of 10 Nm$^3$/min with a ceramic honeycomb filter obtained by alternately plugging flow path ends of a ceramic honeycomb structure of 266.7 mm in diameter and 304.8 mm in length having a cell density of 36.4 cells/cm$^2$ and a cell wall thickness of 0.28 mm in a checkerboard pattern.

A main component of a crystal phase in the ceramic honeycomb structure of the present invention is preferably cordierite, containing 3-6% of spinel and 1-8% of cristobalite.

The porosity is preferably more than 58% and 66% or less.

The average pore size is preferably 20-34 μm.

The thermal expansion coefficient between 20° C. and 800° C. is preferably $3 \times 10^{-7}$–$13 \times 10^{-7}$.

The method of the present invention for producing a ceramic honeycomb structure having a large number of flow paths defined by porous cell walls comprises extrusion-molding a moldable material comprising a cordierite-forming material and a pore-forming material, and sintering the resultant molding;

the cordierite-forming material containing 10-20% of silica;

the silica being in the form of powder having a mode diameter of 30-60 μm, particles having particle sizes of 20 μm or less being 2-10%, particles having particle sizes of 100 μm or more being 2-10%, and particles having particle sizes of 200 μm or more being 1% or less, with a particle size distribution deviation SD [=log($d_{80}$)−log($d_{20}$)] of 0.5 or less, wherein d20 represents a particle size (μm) corresponding to a cumulative volume of 20%, and $d_{80}$ represents a particle size (μm) corresponding to a cumulative volume of 80%, in a curve showing the relation between a particle size and a cumulative particle volume expressed by the volume percentage of particles having a particular particle size or less, and meeting $d_{20}$<$d_{80}$.

The pore-forming material is preferably 1-15% based on the cordierite-forming material, and the pore-forming material is preferably in the form of powder having a mode diameter of 30-70 μm and a particle size distribution deviation SD of 0.5 or less.

The absolute value of the difference between the mode diameter M50 of the silica particles and the mode diameter m50 of the pore-forming material particles, |M50−m50|, is preferably 15 μm or less.

The silica particles preferably have sphericity of 0.5 or more.

The pore-forming material is preferably more than 6% and 15% or less, based on the cordierite-forming material.

DESCRIPTION OF THE PREFERRED EMBODIMENTS

[1] Ceramic Honeycomb Structure

Figure 1A:
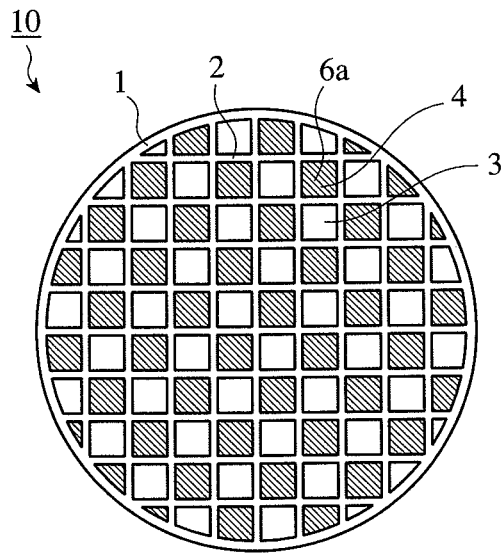
FIG. 1(a) is a schematic cross-sectional view showing one example of honeycomb filters perpendicularly to its flow paths.
Figure 1B:
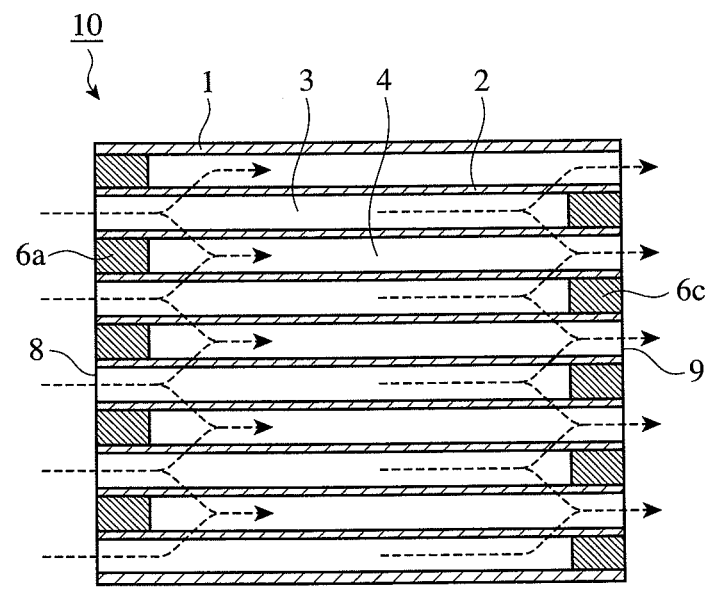
FIG. 1(b) is a schematic cross-sectional view showing one example of honeycomb filters in parallel to its flow paths.
Figure 2:
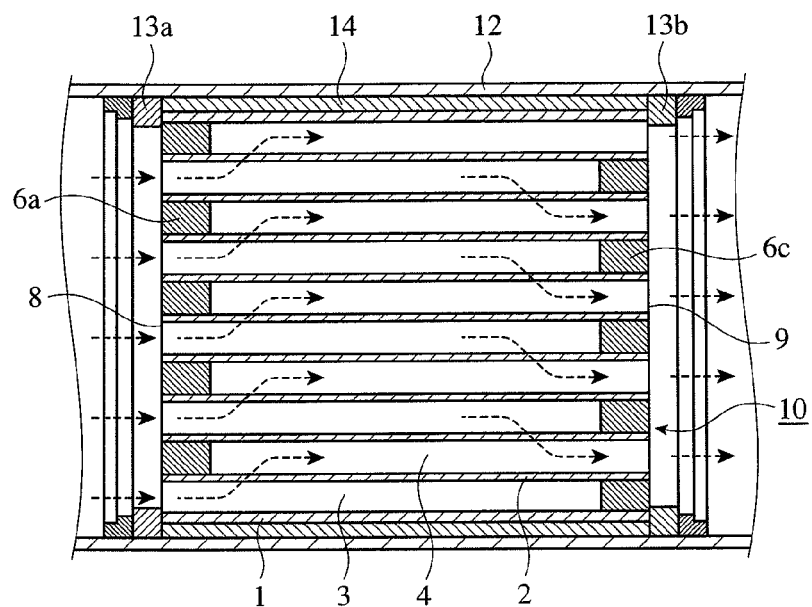
FIG. 2 is a schematic cross-sectional view showing one example of ceramic honeycomb filters contained in a metal container.

The ceramic honeycomb structure of the present invention has well-balanced pressure loss characteristics and strength, by lowering the percentage of coarse pores which would deteriorate pressure loss characteristics, and the percentage of fine pores which would deteriorate strength. This ceramic honeycomb structure can provide a ceramic honeycomb filter with reduced pressure loss and increased strength.

The porosity of porous cell walls is 45-68%. When the porosity of the porous cell walls is less than 45%, the ceramic honeycomb filter suffers large pressure loss. The porosity exceeding 68% provides decreased strength. The porosity of the porous cell walls is preferably 50-67%, more preferably more than 58% and 66% or less, most preferably, 59-66%.

The average pore size is 15-35 μm. The average pore size of less than 15 μm provides increased pressure loss, and the average pore size exceeding 35 μm provides decreased strength. The average pore size is preferably 20-34 μm, more preferably 25-32 μm.

The volume of pores having diameters of more than 50 μm is more than 10% and 25% or less of the total pore volume. When the volume of pores having diameters exceeding 50 μm is 10% or less, the ceramic honeycomb structure has deteriorated pressure loss characteristics. When it exceeds 25%, the percentage of coarse pores lowering the strength increases, providing the ceramic honeycomb structure with low strength. The volume of pores having diameters of more than 50 μm is preferably 11-24%, more preferably 12-23%.

The volume of pores having diameters of 100 μm or more is 1-8% of the total pore volume. When the volume of pores having diameters of 100 μm or more is less than 1%, there are a high percentage of fine pores deteriorating pressure loss characteristics. When it exceeds 8%, there are a high percentage of coarse pores lowering the strength, so that the ceramic honeycomb structure does not have enough strength in use. The volume of pores having diameters of 100 μm or more is preferably 2-7%.

The volume of pores having diameters of less than 10 μm is 3-10% of the total pore volume. Pores having diameters of less than 10 μm secure communications through larger pores, improving the pressure loss characteristics. When the volume of pores having diameters of less than 10 μm is less than 3%, sufficient communications through pores cannot be obtained, resulting in large pressure loss. When it exceeds 10%, the percentage of pores having diameters of more than 10 μm is relatively low despite enough communications, resulting in the deteriorated pressure loss. The volume of pores having diameters of less than 10 μm is preferably 4-8%.

When the pore structure of cell walls has the above porosity, average pore size and pore size distribution, with a pore size distribution deviation a of 0.45 or less, there is a large percentage of pores having diameters of 15-35 μm, resulting in a sharp pore size distribution. Cell walls having such pore structure have small pressure loss and high strength. When the pore size distribution deviation exceeds 0.45, the percentage of pores deteriorating pressure loss characteristics and strength increases, failing to obtain ceramic honeycomb filters meeting both conditions of strength and pressure loss characteristics. The pore size distribution deviation σ is preferably 0.43 or less, more preferably 0.40 or less.

Figure 3:
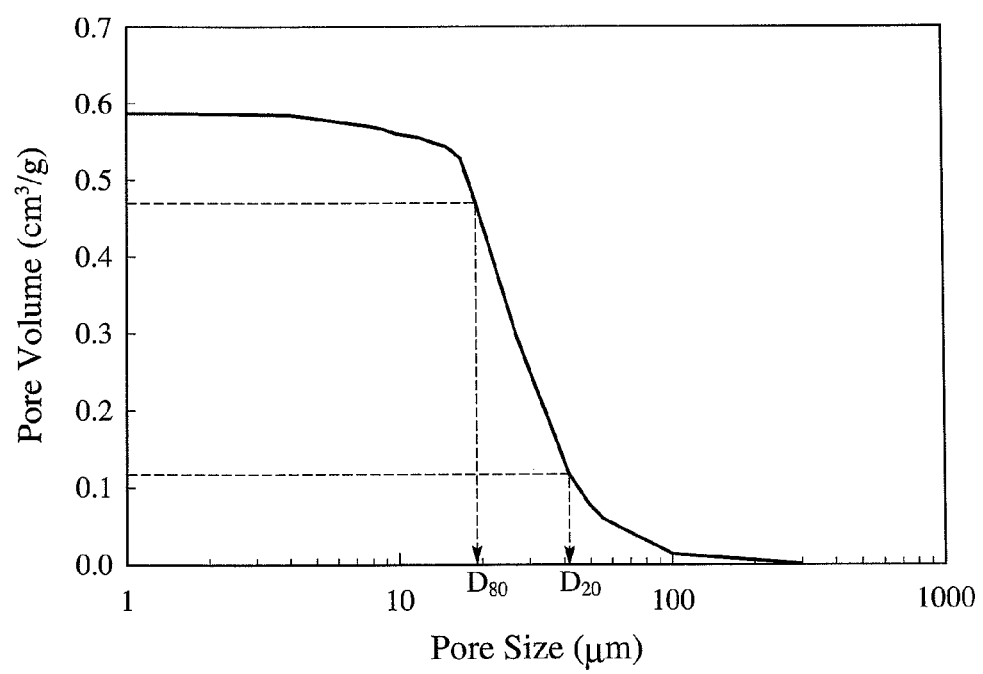
FIG. 3 is a graph showing the relation between a pore size and a pore volume in Example 11 within the present invention.

The pore size distribution deviation σ is determined by $\sigma = \log(D_{20}) - \log(D_{80})$, wherein $D_{20}$ represents a pore size (μm) at a pore volume corresponding to 20% of the total pore volume, and $D_{80}$ represents a pore size (μm) at a pore volume corresponding to 80% of the total pore volume, in a curve showing the relation between a pore size and a cumulative pore volume (cumulative pore volume from the maximum pore size to a particular pore size) as shown in FIG. 3. $D_{80} < D_{20}$. The cumulative pore volume relative to the pore size can be measured by mercury porosimetry, particularly by a mercury porosimeter.

Cell walls having the above porosity, average pore size, pore size distribution and pore size distribution deviation contain pores effective for improving pressure loss characteristics and pores effective for improving strength in good balance, providing the air permeability of $4 \times 10^{-12}$ m$^2$ to $9 \times 10^{-12}$ m$^2$. When the air permeability is less than $4 \times 10^{-12}$ m$^2$, there is large pressure loss. When the air permeability exceeds $9 \times 10^{-12}$ m$^2$, soot is not well captured. The air permeability is more preferably $5 \times 10^{-12}$ m$^2$ to $8 \times 10^{-12}$ m$^2$.

The ceramic honeycomb structure preferably has isostatic strength of 1 MPa or more. When the isostatic strength is less than 1 MPa, the ceramic honeycomb structure is likely to have insufficient strength in use. The isostatic strength is preferably 2 MPa or more.

The cell walls preferably have a thickness of 0.2-0.3 mm, and a cell density of 23-39 cells/cm$^2$. When the thickness of the cell walls is less than 0.2 mm, the cell walls have low strength. When it exceeds 0.3 mm, the ceramic honeycomb structure suffers increased pressure loss. When the cell density is less than 23 cells/cm$^2$, the cell walls have low strength. When it exceeds 39 cells/cm$^2$, the ceramic honeycomb structure suffers increased pressure loss.

A ceramic honeycomb filter obtained by plugging flow path ends of a ceramic honeycomb structure of 266.7 mm in diameter and 304.8 mm in length having a cell density of 36.4 cells/cm$^2$ and a cell wall thickness of 0.28 mm alternately in a checkerboard pattern preferably has a pressure loss of 1.2 kPa or less, when 2 g/liter of soot (2 g of soot per a filter volume of 1 liter) is captured at a flow rate of 10 Nm$^3$/min. When the pressure loss exceeds 1.2 kPa to capture 2 g/liter of soot, the pressure loss is undesirably large. The pressure loss when 2 g/liter of soot is captured is more preferably 1 kPa or less.

When a crystal phase is mainly composed of cordierite, containing 3-6% of spinel and 1-8% of cristobalite, size change (expansion) by sintering can be minimized. Spinel and cristobalite in the crystal phase are more preferably 4-5% and 2-7%, respectively. The crystal phase may additionally contain mullite, corundum, tridymite, etc.

When the ceramic honeycomb structure has a thermal expansion coefficient in a range of $3 \times 10^{-7}$ to $13 \times 10^{-7}$ between 20° C. and 800° C., it has sufficient heat shock resistance even when it is used as a ceramic honeycomb filter for diesel engines, etc. The thermal expansion coefficient is preferably $3.5 \times 10^{-7}$ to $11 \times 10^{-7}$, more preferably $4 \times 10^{-7}$ to $10 \times 10^{-7}$.

Figure 7A:
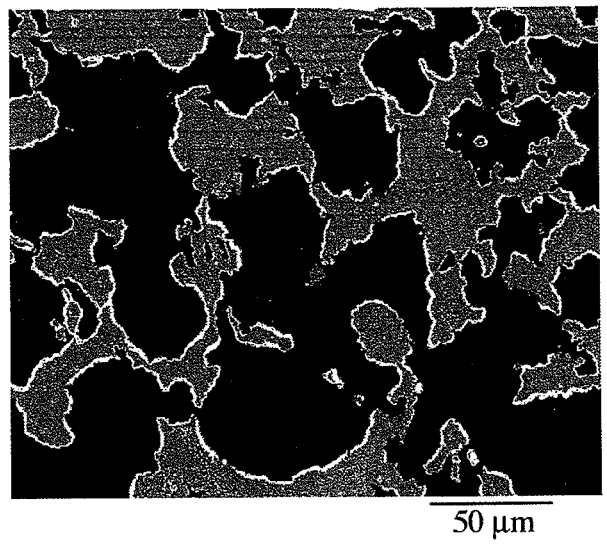
FIG. 7(a) is an electron photomicrograph showing the cross section of a cell wall in the ceramic honeycomb structure of the present invention.
Figure 7B:
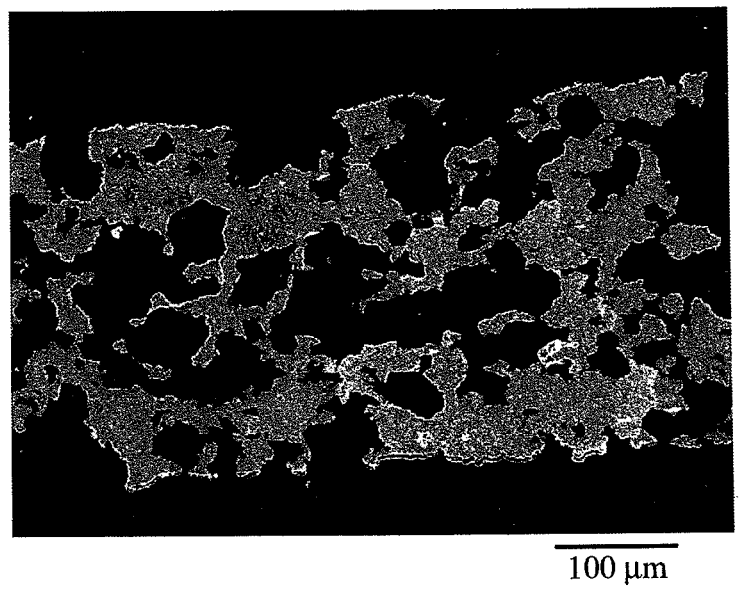
FIG. 7(b) is an electron photomicrograph showing the cross section of another cell wall in the ceramic honeycomb structure of the present invention.

With a cross section area ratio $A_0/A$ of 70 or less in the cell walls, wherein A represents an area of a pore, and $A_0$ represents an area of a circle having a circumference corresponding to the contour length of the pore, the pressure loss can be suppressed. The area ratio $A_0/A$ is preferably 55 or less, more preferably 45 or less. By analyzing the cross section of cell walls in an electron photomicrograph [for example, shown in FIGS. 7(a) and 7(b)] by an image analyzer (Image-Pro Plus Ver. 3.0 available from Media Cybernetics), the area ratio $A_0/A$ is calculated from the area A of each pore [dark portions in FIGS. 7(a) and 7(b)] and the area $A_0$ of a circle having a circumference corresponding to the contour length of each pore.

[2] Production Method of Ceramic Honeycomb Structure

The ceramic honeycomb structure is produced by extrusion-molding a moldable material comprising a cordierite-forming material and a pore-forming material, heating the resultant molding to the highest temperature of 1380-1435° C. at a speed of 2-100° C./hour, sintering it at the highest temperature for 5-30 hours, and then cooling it to 1000° C. at a speed of less than 100° C./hour. The cordierite-forming material comprises 10-20% of silica powder having a mode diameter of 30-60 μm, particles having particle sizes of 20 μm or less being 2-10%, particles having particle sizes of 100 μm or more being 2-10%, and particles having particle sizes of 200 μm or more being 1% or less. The silica powder also has a particle size distribution deviation SD [$=\log(d_{80})-\log(d_{20})$] of 0.5 or less, wherein $d_{20}$ represents a particle size (μm) corresponding to a cumulative volume of 20%, and $d_{80}$ represents a particle size (μm) corresponding to a cumulative volume of 80%, in a curve showing the relation between a particle size and a cumulative volume (expressing the volume percentage of particles with a particular size or less based on the total particles), and $d_{20}<d_{80}$.

The silica powder having a relatively large particle size distribution makes a cordierite-forming sintering reaction slow, forming other crystals than cordierite, such as 3-6% of spinel and 1-8% of cristobalite. Accordingly, the crystal size can be stably controlled with small size change (mainly expansion due to the formation of cordierite) by sintering.

Ceramics, whose main crystal is cordierite, have pores formed by consuming the silica source material in a sintering process. The silica source material is more stable at high temperatures than other starting materials, so that it is melted and diffused at 1300° C. or higher, forming pores. The addition of 10-20% of silica to the cordierite-forming material provides a preferred pore structure. When the silica content exceeds 20%, the amounts of other silica source materials such as kaolin, talc, etc. should be decreased to maintain the state that the main crystal is cordierite. As a result, sufficiently low thermal expansion in an extrusion-molding direction cannot be obtained, resulting in low heat shock resistance. When the silica content is less than 10%, the ceramic honeycomb structure has a small amount of pores, resulting in poor pressure loss characteristics. The silica content is preferably 13-18%.

The use of silica particles having the optimum mode diameter and particle size distribution provides a ceramic honeycomb structure with the optimum pore structure. This ceramic honeycomb structure in turn provides a ceramic honeycomb filter having small pressure loss and sufficient strength in use.

Figure 5:
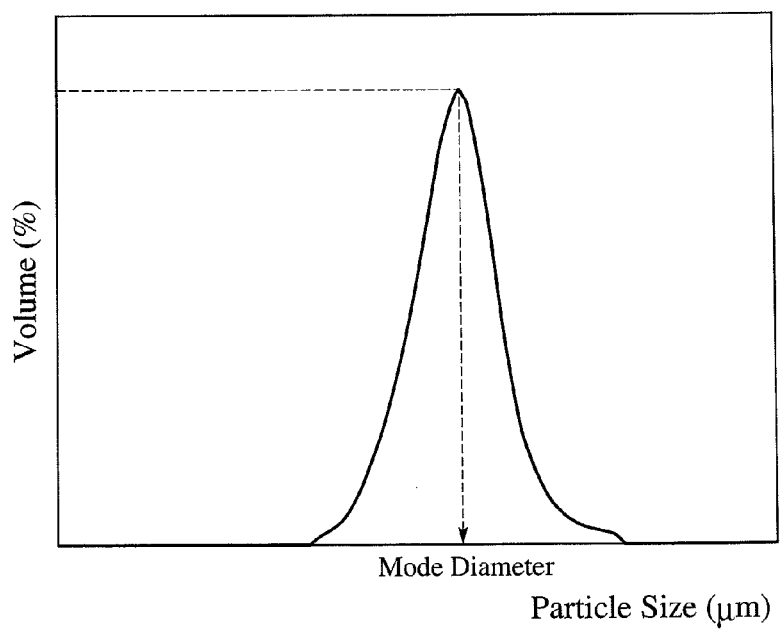
FIG. 5 is a graph showing the particle size distribution of silica particles.

When the mode diameter of silica is less than 30 μm, the ceramic honeycomb structure has many fine pores deteriorating the pressure loss characteristics. When the mode diameter of silica exceeds 60 μm, the ceramic honeycomb structure has many coarse pores decreasing the strength. The mode diameter of silica is preferably 5-55 μm. The mode diameter means a particle size whose volume is the maximum in a volume-based particle size distribution as shown in FIG. 5.

More than 1% of silica particles having particle sizes of 10 μm or less provide more fine pores deteriorating the pressure loss characteristics. The amount of silica particles having particle sizes of 10 μm or less is preferably 0.5% or less.

More than 10% of silica particles having particle sizes of 20 μm or less make the percentage of pores of less than 10 μm in diameter higher and that of pores of more than 10 μm in diameter smaller, so that the ceramic honeycomb filter has poor pressure loss characteristics. When the amount of silica particles having particle sizes of 20 μm or less is less than 2%, the volume of pores of less than 10 μm in diameter is less than 3% of the total pore volume, resulting in insufficient communications of pores and thus poor pressure loss characteristics. The amount of silica particles having particle sizes of 20 μm or less is preferably 3-9%.

When the amount of silica particles having particle sizes of 100 μm or more is more than 10%, and/or when the amount of silica particles having particle sizes of 200 μm or more is more than 1%, the ceramic honeycomb structure has many coarse pores, resulting in low strength. The amount of silica particles having particle sizes of 100 μm or more is preferably 5% or less, and the amount of silica particles having particle size of 200 μm or more is preferably 0.8% or less.

When silica particles have a mode diameter of 30-60 μm, the amount of particles having particle sizes of 20 μm or less being 2-10%, the amount of particles having particle sizes of 100 μm or more being 2-10%, and the amount of particles having particle sizes of 200 μm or more being 1% or less, the particle size distribution deviation SD of silica is 0.5 or less, providing a sharp pore size distribution, small pressure loss, and a smaller percentage of pores deteriorating the strength.

Figure 4:
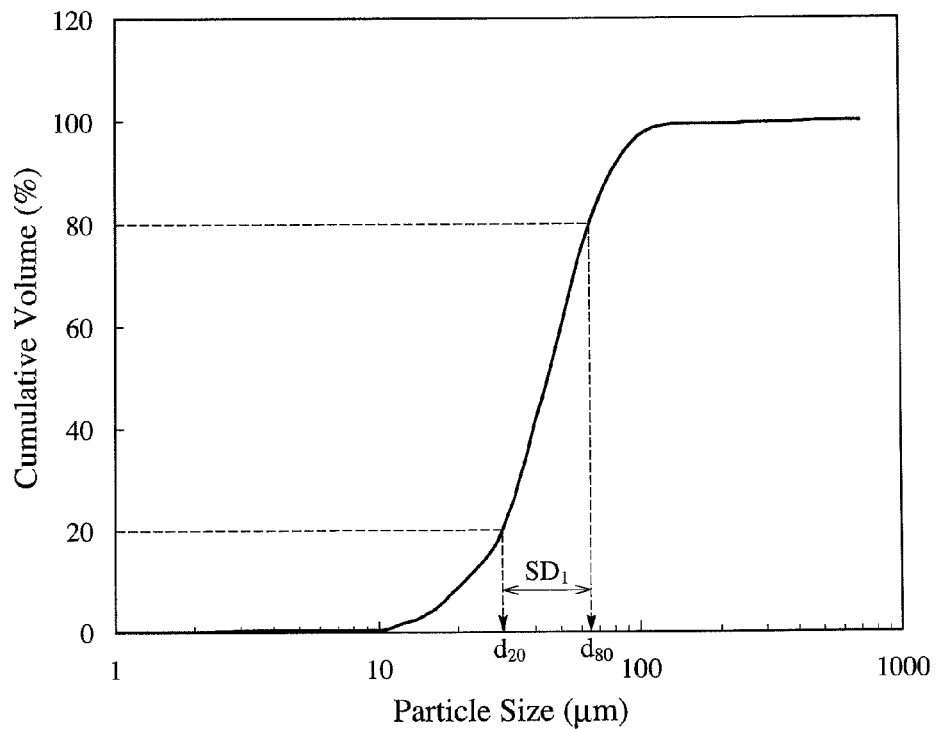
FIG. 4 is a graph showing the particle size distribution of silica used in Example 11 within the present invention.

$SD=\log(d_{80})-\log(d_{20})$, wherein $d_{20}$ represents a particle size (μm) corresponding to a cumulative volume of 20%, and $d_{80}$ represents a particle size (μm) corresponding to a cumulative volume of 80%, in a curve (cumulative particle size distribution curve) showing the relation between a particle size and a cumulative volume expressed by the volume percentage of particles having a particular particle size or less as shown in FIG. 4, and $d_{20}<d_{80}$. The particle size can be measured by a particle size distribution meter (Microtrack MT3000).

The particle size distribution deviation SD exceeding 0.5 provides a broad particle size distribution, resulting in a broad pore size distribution. As a result, the percentage of pores deteriorating the pressure loss characteristics and the strength increases, failing to achieve both small pressure loss and high strength. The particle size distribution deviation SD is preferably 0.4 or less, more preferably 0.3 or less. Silica particles with the above particle size distribution can be obtained by classification, mixing of pluralities of silica particles having arbitrary particle sizes, or pulverization under the optimized conditions.

The silica particles may be crystalline or amorphous, though amorphous silica is preferable from the aspect of particle size distribution control. Amorphous silica can be obtained by pulverizing an ingot formed by melting high-purity, natural silica stone at high temperatures. Silica particles may contain $Na_2O$, $K_2O$, CaO, etc. as impurities, but the total amount of the impurities is preferably 0.1% or less to avoid a large thermal expansion coefficient.

The pore-forming material is preferably 1-15% based on the cordierite-forming material. In the sintering process of cordierite ceramics, the pore-forming material is burned out before cordierite is synthesized, forming pores. When the pore-forming material is less than 1%, a small amount of pores are formed by the pore-forming material, resulting in poor pressure loss characteristics. When the pore-forming material exceeds 15%, too many pores are formed, failing to keep sufficient strength. The pore-forming material is preferably more than 6% and 15% or less, more preferably 6.1-14%, most preferably 6.5-13%.

The pore-forming material may be known flour, graphite, starch, foaming resins such as polyethylene, polyethylene terephthalate and acrylic microcapsules, etc. Among them, the foaming resins of methyl methacrylate-acrylonitrile copolymers are preferable. the foaming resins may be before or after foaming, but foamed resins are preferable.

The pore-forming material particles preferably have a mode diameter of 30-70 μm. When the mode diameter is less than 30 μm, there are a small number of pores contributing to pressure loss decrease, resulting in poor pressure loss characteristics. When the mode diameter is more than 70 μm, coarse pores are formed, failing to obtain sufficient strength. The mode diameter of the pore-forming material particles is preferably 40-60 μm.

The particle size distribution deviation SD of the pore-forming material is preferably 0.5 or less. A pore-forming material having a particle size distribution deviation SD of 0.5 or less provides a sharp pore size distribution, resulting in small pressure loss and a small percentage of pores deteriorating strength. As a result, porous cell walls having the optimum pore structure are formed, providing a ceramic honeycomb structure having small pressure loss and high strength. A particle size distribution deviation SD of the pore-forming material exceeding 0.5 provides a broad particle size distribution, resulting in a broad pore size distribution. As a result, the percentage of pores deteriorating pressure loss characteristics and strength increases, failing to achieve small pressure loss and high strength. The particle size distribution deviation SD of the pore-forming material is preferably 0.4 or less.

The absolute value of the difference between the mode diameter M50 of the silica and the mode diameter m50 of the pore-forming material, |M50−m50|, is preferably 15 μm or less. |M50−m50| of 15 μm or less provides uniform particle size distributions of silica and the pore-forming material, so that pores formed by sintering silica, etc. in cordierite ceramics and pores formed by burning the pore-forming material have similar distribution. As a result, the pressure loss characteristics are improved, and the percentage of pores having no adverse influence on the strength increases, providing a ceramic honeycomb structure with small pressure loss and high strength. |M50−m50| is preferably 10 μm or less, more preferably 8 μm or less, most preferably 6 μm or less. The absolute value of the difference between the mode diameter M50 of talc in the cordierite-forming material and the mode diameter m50 of the pore-forming material, |M50−m50|, may be 15 μm or less.

Silica particles preferably have sphericity of 0.5 or more. When the sphericity is less than 0.5, there are a high percentage of fine pores adversely affecting pressure loss characteristics, and there are also many coarse pores lowering the strength. The sphericity is preferably 0.6 or more, more preferably 0.7 or more. The sphericity of silica particles is determined by averaging ratios of the projected areas of 20 particles determined by image analysis on an electron photomicrograph to the areas of circles each having a diameter equal to a maximum length of each particle between two points on its circumference at which a straight line passing its center of gravity crosses.

Figure 6:
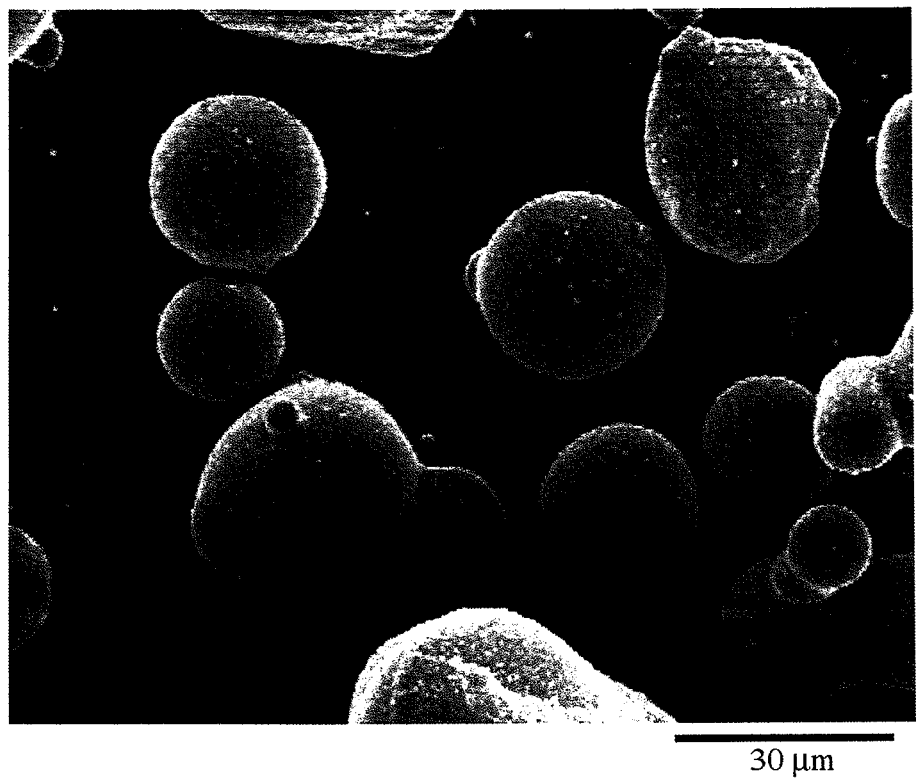
FIG. 6 is an electron photomicrograph showing one example of silica particles.

High-sphericity silica particles are preferably spherical amorphous silica as shown in FIG. 6. The spherical silica particles are obtained by spraying finely pulverized, high-purity, natural silica stone into a high-temperature flame to simultaneously melt and spheroidize silica particles. The particle sizes of spherical silica particles are controlled preferably by classification, etc.

The cordierite-forming material is obtained by mixing starting material powders comprising a silica source, an alumina source and a magnesia source, such that its main crystal is cordierite whose main components are 42-56% by mass of $SiO_2$, 30-45% by mass of $Al_2O_3$, and 12-16% of MgO.

The silica source comprises kaolin powder, talc powder, etc. in addition to the above silica powder.

The alumina source is preferably aluminum hydroxide and/or aluminum oxide because of few impurities. The total amount of $Na_2O$, $K_2O$ and CaO in aluminum hydroxide or aluminum oxide is preferably 0.5% or less by mass, more preferably 0.3% or less by mass, most preferably 0.1% or less by mass. The amount of aluminum hydroxide, if used, in the cordierite-forming material is preferably 6-42% by mass, more preferably 6-15% by mass, most preferably 8-12% by mass. The amount of aluminum oxide, if used, in the cordierite-forming material is preferably 30% or less by mass, more preferably 12-25% by mass, most preferably 20-24% by mass.

To obtain a low thermal expansion coefficient and the preferred pore size distribution, the alumina source preferably has an average particle size of 0.5-5 μm in the case of aluminum hydroxide, and 2-10 μm in the case of aluminum oxide. Because aluminum oxide retains its form up to relatively high temperatures during sintering, its particle size distribution affects the pore size distribution of the sintered ceramic honeycomb structure. Accordingly, to obtain a ceramic honeycomb structure having porosity of 45-68% and an average pore size of 15-35 μm, it is preferable to use aluminum oxide powder comprising 5% or less by mass of powder having a particle size of 45 μm or more, 2-22% by mass of powder having a particle size of 20 μm or more, 13-33% by mass of powder having a particle size of 10 μm or more, 40-68% by mass of powder having a particle size of 5 μm or more, and 50% or more of powder having a particle size of 2 μm or more.

The kaolin powder is preferably 1-15% by mass. The addition of more than 15% by mass of kaolin powder makes it difficult to control the ceramic honeycomb structure to have 10% or less of pores having diameters of less than 10 μm, and the addition of less than 1% by mass of kaolin powder provides the ceramic honeycomb structure with a large thermal expansion coefficient. The kaolin powder content is more preferably 4-8% by mass.

The magnesia source may be talc, magnesite, magnesium hydroxide, etc., and talc is preferable to reduce the thermal expansion coefficient. To reduce the thermal expansion coefficient of the ceramic honeycomb structure whose crystal phase is mainly composed of cordierite, talc is preferably in the form of planar particles. A shape coefficient indicating the flatness of talc particles is preferably 0.77 or more, more preferably 0.8 or more, most preferably 0.83 or more. As described in U.S. Pat. No. 5,141,686 A, the shape coefficient is determined by the following formula:

$$\text{Shape coefficient} = I_x/(I_x + 2I_y),$$

wherein Ix is the diffraction intensity of a (004) plane of talc, and Iy is the diffraction intensity of a (020) plane of talc, both obtained by the X-ray diffraction measurement of planar talc particles in an oriented state. The larger the shape coefficient is, the higher flatness talc particles have.

Talc is preferably 40-43% by mass, and its average particle size is preferably 5-20 μm. The magnesia source such as talc may contain $Fe_2O_3$, CaO, $Na_2O$, $K_2O$, etc. as impurities. To obtain the desired particle size distribution, the $Fe_2O_3$ content in the magnesia source is preferably 0.5-2.5% by mass. To have a low thermal expansion coefficient, the total amount of $Na_2O$, $K_2O$ and CaO is preferably 0.50% or less by mass.

Because the method of the present invention is characterized by using silica having the controlled particle size distribution as described above, the mixing of a cordierite-forming material containing silica particles, a pore-forming material, a binder, etc. is preferably conducted by a means having no pulverization media (Henschel mixer, etc.) to avoid silica particles, particularly amorphous silica particles, from being pulverized. An extrusion-moldable material is preferably blended by a means using no excess shearing (kneader, etc.). Using a mixing method without pulverization media or a kneading method without excess shearing, silica particles having a desired particle size distribution and particle shapes can exist without change in extrusion-molded products, resulting in a ceramic honeycomb structure having a desired pore size distribution and thus small pressure loss and high strength. Particularly when spherical silica is used, the above mixing method and kneading method are effective. In the case of a mixing method using pulverization media such as a ball mill, etc., silica particles are destroyed during a mixing process, failing to obtain the desired pore size distribution.

The ceramic honeycomb structure of the present invention can be formed into a ceramic honeycomb filter with both ends of flow paths plugged alternately in a checkerboard pattern, or a ceramic honeycomb filter with plugs inside flow paths.

The present invention will be described in more detail with reference to Examples below without intention of restricting the scope of this invention.

EXAMPLE 1

17.5 parts by mass of silica powder (mode diameter: 33 μm, particles having particle sizes of 20 μm or less: 9.5%, particles having particle sizes of 100 μm or more: 3.0%, particles having particle sizes of 200 μm or more: 0.9%, particle size distribution deviation SD: 0.45, and sphericity: 0.5), 7.6 parts by mass of kaolin powder (average particle size: 3.0 μm), 41 parts by mass of talc powder (average particle size: 12.0 μm), 22.8 parts by mass of alumina powder (average particle size: 6.2 μm), and 11.1 parts by mass of aluminum hydroxide powder (average particle size: 1.8 μm) were mixed to form a cordierite-forming material powder having a composition comprising 50% by mass of $SiO_2$, 35% by mass of $Al_2O_3$ and 13% by mass of MgO. This cordierite-forming material powder was mixed with a foamed resin (pore-forming material) and methylcellulose (binder), and kneaded together with water to form a moldable ceramic material comprising the cordierite-forming material. This moldable material was extrusion-molded to a honeycomb structure, dried, deprived of a peripheral portion by machining, and sintered by heating from 1000° C. to 1410° C. at a speed of 20° C./h, keeping the highest temperature of 1410° C. for 24 hours, and cooling from 1410° C. to 1000° C. at a speed of 50° C./h, for 200 hours in total, in the air. A periphery of the sintered ceramic honeycomb was coated with a skin layer comprising amorphous silica and colloidal silica, and dried to obtain a ceramic honeycomb structure of 266.7 mm in outer diameter and 304.8 mm in length having a cell density of 39 cells/$cm^2$ and a cell wall thickness of 0.30 mm.

With respect to silica powder, the mode diameter, the percentage of particle sizes of 20 μm or less, the percentage of particle sizes of 100 μm or more, and the percentage of particle sizes of 200 μm or more were determined from a particle size distribution measured by a particle size distribution meter (Microtrack MT3000). The sphericity of silica particles was determined by averaging ratios of the projected areas of 20 particles determined by image analysis on an electron photomicrograph to the areas of circles each having a diameter equal to a maximum length of each particle between two points on its circumference at which a straight line passing its center of gravity crossed.

The average particle sizes of kaolin powder, talc powder, alumina powder and aluminum hydroxide powder were measured by a particle size distribution meter (Microtrack MT3000). The shape coefficient of talc was determined as described in U.S. Pat. No. 5,141,686 A. Namely, planar talc particles dispersed in acetone were applied to a glass plate, and subject to X-ray diffraction measurement in an oriented state to determine the shape coefficient of talc by the following formula:

Shape coefficient=$Ix/(Ix+2Iy)$, wherein Ix was the diffraction intensity of a (004) plane, and Iy was the diffraction intensity of a (020) plane.

Flow path ends of the ceramic honeycomb structure were plugged with a cordierite-forming material slurry alternately in a checkerboard pattern, dried, and sintered to produce a cordierite-based ceramic honeycomb filter. The length of each plug in a flow path direction was adjusted to 7-10 mm.

EXAMPLES 2-31 and COMPARATIVE EXAMPLES 1-6

Ceramic honeycomb filters were produced in the same manner as in Example 1, except for changing the silica powder, the kaolin powder, the talc powder, the alumina powder, the aluminum hydroxide powder and the pore-forming material as shown in Table 1, and changing the cell wall thickness and the cell density as shown in Table 2.

With respect to the ceramic honeycomb filters of Examples 1-31 and Comparative Examples 1-6, the amounts of crystals, the air permeability, the soot-capturing pressure loss, the pore structure, the thermal expansion coefficient, the isostatic strength, the dimensional accuracy and the area ratio of pores were evaluated. The results are shown in Table 2.

Amounts of Crystals

The amount of each crystal was determined by dividing the X-ray diffraction intensity of each crystal by the total X-ray diffraction intensity of cordierite, spinel, cristobalite, corundum and mullite [X-ray diffraction intensity of (102) plane of cordierite+X-ray diffraction intensity of plane (220) of spinel+X-ray diffraction intensity of (220) plane of cristobalite+X-ray diffraction intensity of (104) plane of corundum+X-ray diffraction intensity of (110) plane of mullite]. The amounts of cordierite, spinel and cristobalite are shown in Table 2.

Air Permeability

The air permeability was measured by Perm Automated Porometer (registered trademark) version 6.0 (available from Porous Materials, Inc.) at an air flow rate from 30 cc/sec to 400 cc/sec. The maximum air permeability in this range was evaluated by the following standard:

Excellent The maximum air permeability was $5 \times 10^{-12}$ $m^2$ to $8 \times 10^{-12}$ $m^2$.

Good The maximum air permeability was $4 \times 10^{-12}$ $m^2$ or more and less than $5 \times 10^{-12}$ $m^2$, or more than $8 \times 10^{-12}$ $m^2$ and $9 \times 10^{-12}$ $m^2$ or less.

Poor The maximum air permeability was less than $4 \times 10^{-12}$ $m^2$ or more than $9 \times 10^{-12}$ $m^2$.

Pressure Loss when Capturing Soot

Carbon powder having particle sizes of 0.042 μm was supplied at a speed of 3 g/h to a ceramic honeycomb filter fixed to a pressure-loss-testing stand together with air at a flow rate of 10 $Nm^3$/min, to measure pressure difference (pressure loss) between the inlet and outlet sides of the filter when the amount of soot accumulated reached 2 g per 1 liter of a filter volume. The pressure loss when capturing soot was evaluated by the following standard:

Excellent The pressure loss was 1.2 kPa or less.

Good The pressure loss was more than 1.2 kPa and 1.5 kPa or less.

Poor The pressure loss was more than 1.5 kPa.

Pore Structure

The porosity, the average pore size, the volume of pores having diameters of less than 10 μm, the volume of pores having diameters of more than 50 μm, and the volume of pores having diameters of 100 μm or more were measured by mercury porosimetry. A test piece (10 mm×10 mm×10 mm) cut out of each ceramic honeycomb filter was set in a measurement cell of Autopore III available from Micromeritics, evacuated, and then pressurized by introducing mercury. The relation between a pore size and a cumulative pore volume was determined from pressure when pressurized and the volume of mercury entering pores in the test piece. At a mercury-introducing pressure of 0.6 psi ($0.42 \times 10^{-3}$ $kgf/mm^2$), the pore size was calculated from pressure with a contact angle of 130° and a surface tension of 484 dyne/cm. The porosity was calculated from the measured total pore volume, with a true specific gravity of cordierite of 2.52 $g/cm^3$.

Thermal Expansion Coefficient

A test piece having a cross section of 4.5 mm×4.5 mm and a length of 50 mm was cut out of each ceramic honeycomb structure such that it extended substantially along the flow path direction, and heated from room temperature to 800° C. at a temperature elevation speed of 10° C./minute under a constant load of 20 g. During heating, the increase of the longitudinal length of the test piece was measured by a compression load/differential expansion-type thermomechanical analyzer (TMA, ThermoPlus available from Rigaku), to determine its average thermal expansion coefficient (CTE) between 20° C. and 800° C.

Isostatic Strength

The isostatic strength test was conducted according to M505-87 of the Japanese Automotive Standards Organization (JASO) issued by the Society of Automotive Engineers of Japan. Each ceramic honeycomb structure was sealed by 20-mm-thick aluminum plates attached to both axial end surfaces, and placed in a pressure vessel with its peripheral surface in contact with a 2-mm-thick rubber. Water was poured into the pressure vessel to exert hydrostatic pressure to the peripheral surface, and the pressure at which the ceramic honeycomb structure was broken was regarded as isostatic strength. The isostatic strength was evaluated by the following standard:

Good Not broken even at a pressure of 2 MPa.
Fair Broken at a pressure of 1.0 MPa or more and less than 2.0 MPa.
Poor Broken at a pressure of less than 1.0 MPa.

Dimensional Accuracy

With respect to dimensional accuracy, how much the cell wall thickness and the cell pitch deviated from the target values due to sintering expansion was evaluated by the following standard:

Excellent Deviation from the target value was 10% or less.
Good Deviation from the target value was more than 10% and 20% or less.
Poor Deviation from the target value was more than 20%.

Area Ratio of Pores

On an electron photomicrograph of a cell wall cross section of a sample cut out of the honeycomb filter after the test, the shapes of pores were analyzed by an image analyzer (Image-Pro Plus ver.3.0 available from Media Cybernetics). The area ratio of pores is expressed by $A_O/A$, wherein A represents the total area of pores [for example, dark portions in FIGS. 7(a) and 7(b)], and $A_O$ represents the total area of circles each having a circumference equal to the peripheral length of each pore.

TABLE 1

| | Silica | | | |
| --- | --- | --- | --- | --- |
| | | Percentage (%) | | |
| No. | Mode Diameter M50 (μm) | Particles of 20 μm or less | Particles of 100 μm or more | Particles of 200 μm or more |
| Example 1 | 33 | 9.5 | 3.0 | 0.9 |
| Example 2 | 35 | 9.5 | 3.0 | 0.8 |
| Example 3 | 40 | 9.5 | 3.0 | 0.9 |
| Example 4 | 45 | 9.5 | 3.0 | 0.9 |
| Example 5 | 60 | 9.5 | 3.0 | 0.9 |
| Example 6 | 60 | 9.5 | 3.0 | 0.9 |
| Example 7 | 30 | 9.5 | 3.0 | 0.9 |
| Example 8 | 30 | 9.5 | 3.0 | 0.9 |
| Example 9 | 33 | 9.0 | 3.0 | 0.7 |
| Example 10 | 45 | 9.0 | 3.0 | 0.7 |
| Example 11 | 45 | 8.5 | 3.0 | 0.6 |
| Example 12 | 45 | 8.5 | 3.0 | 0.6 |
| Example 13 | 45 | 8.5 | 3.0 | 0.6 |
| Example 14 | 45 | 9.0 | 3.0 | 0.9 |
| Example 15 | 45 | 9.0 | 3.0 | 0.9 |
| Example 16 | 60 | 9.5 | 3.0 | 0.9 |
| Example 17 | 60 | 9.5 | 3.0 | 0.9 |
| Example 18 | 60 | 9.5 | 3.0 | 0.9 |
| Example 19 | 60 | 9.5 | 3.0 | 0.9 |
| Example 20 | 35 | 9.5 | 3.0 | 0.9 |
| Example 21 | 38 | 9.5 | 3.0 | 0.9 |
| Example 22 | 40 | 7.0 | 3.0 | 0.8 |
| Example 23 | 45 | 7.5 | 3.0 | 0.8 |
| Example 24 | 45 | 7.5 | 3.0 | 0.8 |
| Example 25 | 45 | 7.5 | 3.0 | 0.8 |
| Example 26 | 45 | 7.5 | 3.0 | 0.8 |
| Example 27 | 33 | 9.5 | 3.0 | 0.9 |
| Example 28 | 40 | 9.5 | 3.0 | 0.9 |
| Example 29 | 45 | 9.0 | 3.0 | 0.7 |
| Example 30 | 40 | 7.0 | 3.0 | 0.8 |
| Example 31 | 45 | 7.5 | 3.0 | 0.8 |
| Comparative Example 1 | 20 | 50.0 | 15.0 | 0.0 |
| Comparative Example 2 | 70 | 15.0 | 20.0 | 0.0 |

TABLE 1-continued

| | | | | |
|---|---|---|---|---|
| Comparative Example 3 | 40 | 25.0 | 3.0 | 1.0 |
| Comparative Example 4 | 40 | 20.0 | 20.0 | 5.0 |
| Comparative Example 5 | 45 | 20.0 | 3.0 | 1.1 |
| Comparative Example 6 | 63 | 9.5 | 3.0 | 0.9 |

| | Silica | | | |
|---|---|---|---|---|
| No. | SD[1] [log(μm)] | Sphericity | Amount (%) | Impurities[2] (%) |
| Example 1 | 0.45 | 0.5 | 17.5 | 0.005 |
| Example 2 | 0.49 | 0.5 | 17.5 | 0.005 |
| Example 3 | 0.48 | 0.6 | 17.5 | 0.005 |
| Example 4 | 0.50 | 0.6 | 17.5 | 0.005 |
| Example 5 | 0.47 | 0.5 | 17.5 | 0.005 |
| Example 6 | 0.43 | 0.5 | 17.5 | 0.005 |
| Example 7 | 0.49 | 0.5 | 20.0 | 0.005 |
| Example 8 | 0.47 | 0.5 | 14.0 | 0.005 |
| Example 9 | 0.40 | 0.7 | 16.0 | 0.005 |
| Example 10 | 0.37 | 0.7 | 16.0 | 0.005 |
| Example 11 | 0.34 | 0.8 | 18.0 | 0.005 |
| Example 12 | 0.35 | 0.8 | 18.0 | 0.005 |
| Example 13 | 0.35 | 0.8 | 18.0 | 0.005 |
| Example 14 | 0.49 | 0.5 | 16.0 | 0.006 |
| Example 15 | 0.49 | 0.5 | 16.0 | 0.006 |
| Example 16 | 0.43 | 0.6 | 16.0 | 0.006 |
| Example 17 | 0.43 | 0.6 | 16.0 | 0.006 |
| Example 18 | 0.43 | 0.6 | 16.0 | 0.006 |
| Example 19 | 0.43 | 0.6 | 16.0 | 0.006 |
| Example 20 | 0.45 | 0.5 | 17.5 | 0.006 |
| Example 21 | 0.44 | 0.5 | 17.5 | 0.006 |
| Example 22 | 0.39 | 0.8 | 17.5 | 0.006 |
| Example 23 | 0.40 | 0.8 | 17.5 | 0.006 |
| Example 24 | 0.40 | 0.8 | 17.5 | 0.006 |
| Example 25 | 0.40 | 0.8 | 17.5 | 0.006 |
| Example 26 | 0.40 | 0.8 | 17.5 | 0.006 |
| Example 27 | 0.5 | 0.5 | 17.5 | 0.005 |
| Example 28 | 0.5 | 0.6 | 17.5 | 0.005 |
| Example 29 | 0.4 | 0.7 | 16.0 | 0.005 |
| Example 30 | 0.4 | 0.8 | 17.5 | 0.006 |
| Example 31 | 0.4 | 0.8 | 17.5 | 0.006 |
| Comparative Example 1 | 0.67 | 0.6 | 16.0 | 0.005 |
| Comparative Example 2 | 0.60 | 0.6 | 16.0 | 0.005 |
| Comparative Example 3 | 0.64 | 0.6 | 16.0 | 0.005 |
| Comparative Example 4 | 0.70 | 0.6 | 16.0 | 0.005 |
| Comparative Example 5 | 0.60 | 0.1 | 16.0 | 0.006 |
| Comparative Example 6 | 0.47 | 0.5 | 17.5 | 0.005 |

Note:
[1]SD represents a particle size distribution deviation.
[2]The total amount of (CaO + Na$_2$O + K$_2$O) existing as impurities in silica, kaolin, talc and alumina.

| | Kaolin | | | Talc | | | |
|---|---|---|---|---|---|---|---|
| No. | Amount (%) | Average Particle Size (μm) | Impurities[1] (%) | Amount (%) | Average Particle Size (μm) | Impurities[1] (%) | Shape Coefficient |
| Example 1 | 7.6 | 3.0 | 0.32 | 41 | 12.0 | 0.50 | 0.78 |
| Example 2 | 7.6 | 3.0 | 0.32 | 41 | 10.5 | 0.48 | 0.77 |
| Example 3 | 7.6 | 4.0 | 0.32 | 41 | 10.5 | 0.48 | 0.78 |
| Example 4 | 7.6 | 4.0 | 0.32 | 41 | 10.5 | 0.48 | 0.78 |
| Example 5 | 7.6 | 3.0 | 0.32 | 41 | 10.5 | 0.48 | 0.77 |
| Example 6 | 7.6 | 3.0 | 0.32 | 41 | 10.5 | 0.48 | 0.77 |
| Example 7 | 1.7 | 3.0 | 0.32 | 41 | 12.0 | 0.50 | 0.75 |
| Example 8 | 14.6 | 3.0 | 0.32 | 41 | 12.0 | 0.50 | 0.81 |
| Example 9 | 10.3 | 3.0 | 0.32 | 41 | 12.0 | 0.50 | 0.80 |
| Example 10 | 10.3 | 3.0 | 0.32 | 41 | 12.0 | 0.50 | 0.79 |
| Example 11 | 6.0 | 3.0 | 0.32 | 41 | 12.0 | 0.50 | 0.77 |
| Example 12 | 6.0 | 3.0 | 0.32 | 41 | 12.0 | 0.50 | 0.77 |

TABLE 1-continued

| | | | | | | | |
|---|---|---|---|---|---|---|---|
| Example 13 | 6.0 | 3.0 | 0.32 | 41 | 12.0 | 0.50 | 0.77 |
| Example 14 | 10.3 | 4.0 | 0.32 | 41 | 12.0 | 0.50 | 0.81 |
| Example 15 | 10.3 | 4.0 | 0.32 | 41 | 12.0 | 0.50 | 0.82 |
| Example 16 | 10.3 | 3.0 | 0.32 | 41 | 12.0 | 0.50 | 0.82 |
| Example 17 | 10.3 | 3.0 | 0.32 | 41 | 12.0 | 0.50 | 0.81 |
| Example 18 | 10.3 | 3.0 | 0.32 | 41 | 12.0 | 0.50 | 0.82 |
| Example 19 | 10.3 | 3.0 | 0.32 | 41 | 12.0 | 0.50 | 0.82 |
| Example 20 | 7.6 | 3.0 | 0.32 | 41 | 10.5 | 0.48 | 0.84 |
| Example 21 | 7.6 | 3.0 | 0.32 | 41 | 10.5 | 0.48 | 0.83 |
| Example 22 | 7.6 | 3.0 | 0.32 | 41 | 12.0 | 0.50 | 0.84 |
| Example 23 | 7.6 | 3.0 | 0.32 | 41 | 12.0 | 0.50 | 0.85 |
| Example 24 | 7.6 | 3.0 | 0.32 | 41 | 12.0 | 0.50 | 0.84 |
| Example 25 | 7.6 | 3.0 | 0.32 | 41 | 12.0 | 0.50 | 0.83 |
| Example 26 | 7.6 | 3.0 | 0.32 | 41 | 12.0 | 0.50 | 0.81 |
| Example 27 | 7.6 | 3.0 | 0.32 | 41 | 12.0 | 0.50 | 0.77 |
| Example 28 | 7.6 | 4.0 | 0.32 | 41 | 10.5 | 0.48 | 0.77 |
| Example 29 | 10.3 | 3.0 | 0.32 | 41 | 12.0 | 0.50 | 0.79 |
| Example 30 | 7.6 | 3.0 | 0.32 | 41 | 12.0 | 0.50 | 0.80 |
| Example 31 | 7.6 | 3.0 | 0.32 | 41 | 12.0 | 0.50 | 0.79 |
| Comparative Example 1 | 10.3 | 3.0 | 0.32 | 41 | 12.0 | 0.50 | 0.79 |
| Comparative Example 2 | 10.3 | 3.0 | 0.32 | 41 | 12.0 | 0.50 | 0.80 |
| Comparative Example 3 | 10.3 | 4.0 | 0.32 | 41 | 12.0 | 0.50 | 0.80 |
| Comparative Example 4 | 10.3 | 4.0 | 0.32 | 41 | 12.0 | 0.50 | 0.79 |
| Comparative Example 5 | 10.3 | 3.0 | 0.32 | 41 | 12.0 | 0.50 | 0.80 |
| Comparative Example 6 | 7.6 | 3.0 | 0.32 | 41 | 10.5 | 0.48 | 0.77 |

Note:
[1] The total amount of (CaO + $Na_2O$ + $K_2O$) existing as impurities in silica, kaolin, talc and alumina.

| | Alumina | | | Aluminum Hydroxide | | |
|---|---|---|---|---|---|---|
| No. | Amount (%) | Average Particle Size (μm) | Impurities[1] (%) | Amount (%) | Average Particle Size (μm) | Impurities[1] (%) |
| Example 1 | 22.8 | 6.2 | 0.30 | 11.1 | 1.8 | 0.05 |
| Example 2 | 22.8 | 6.2 | 0.30 | 11.1 | 1.8 | 0.05 |
| Example 3 | 22.8 | 6.2 | 0.30 | 11.1 | 1.8 | 0.05 |
| Example 4 | 22.8 | 6.2 | 0.30 | 11.1 | 1.8 | 0.05 |
| Example 5 | 22.8 | 4.2 | 0.04 | 11.1 | 1.8 | 0.05 |
| Example 6 | 22.8 | 4.2 | 0.04 | 11.1 | 1.8 | 0.05 |
| Example 7 | 24.8 | 6.2 | 0.30 | 12.0 | 1.8 | 0.05 |
| Example 8 | 20.7 | 6.2 | 0.30 | 10.0 | 1.8 | 0.05 |
| Example 9 | 22.0 | 6.2 | 0.30 | 10.6 | 1.8 | 0.05 |
| Example 10 | 22.0 | 6.2 | 0.30 | 10.6 | 1.8 | 0.05 |
| Example 11 | 23.3 | 6.2 | 0.30 | 11.2 | 1.8 | 0.05 |
| Example 12 | 23.3 | 6.2 | 0.30 | 11.2 | 1.8 | 0.05 |
| Example 13 | 23.3 | 6.2 | 0.30 | 11.2 | 1.8 | 0.05 |
| Example 14 | 22.0 | 4.2 | 0.04 | 10.6 | 1.8 | 0.05 |
| Example 15 | 22.0 | 4.2 | 0.04 | 10.6 | 1.8 | 0.05 |
| Example 16 | 22.0 | 6.2 | 0.30 | 10.6 | 1.8 | 0.05 |
| Example 17 | 22.0 | 6.2 | 0.30 | 10.6 | 1.8 | 0.05 |
| Example 18 | 22.0 | 6.2 | 0.30 | 10.6 | 1.8 | 0.05 |
| Example 19 | 22.0 | 6.2 | 0.30 | 10.6 | 1.8 | 0.05 |
| Example 20 | 22.8 | 8.1 | 0.10 | 11.1 | 1.8 | 0.05 |
| Example 21 | 22.8 | 8.1 | 0.10 | 11.1 | 1.8 | 0.05 |
| Example 22 | 20.7 | 6.2 | 0.30 | 11.1 | 1.8 | 0.05 |
| Example 23 | 20.7 | 6.2 | 0.30 | 11.1 | 1.8 | 0.05 |
| Example 24 | 20.7 | 6.2 | 0.30 | 11.1 | 1.8 | 0.05 |
| Example 25 | 20.7 | 6.2 | 0.30 | 11.1 | 1.8 | 0.05 |
| Example 26 | 20.7 | 6.2 | 0.30 | 11.1 | 1.8 | 0.05 |
| Example 27 | 22.8 | 6.2 | 0.30 | 11.1 | 1.8 | 0.05 |
| Example 28 | 22.8 | 6.2 | 0.30 | 11.1 | 1.8 | 0.05 |
| Example 29 | 22.0 | 6.2 | 0.30 | 10.6 | 1.8 | 0.05 |
| Example 30 | 20.7 | 6.2 | 0.30 | 11.1 | 1.8 | 0.05 |
| Example 31 | 20.7 | 6.2 | 0.30 | 11.1 | 1.8 | 0.05 |
| Comparative Example 1 | 22.0 | 6.2 | 0.30 | 10.6 | 1.8 | 0.05 |
| Comparative Example 2 | 22.0 | 6.2 | 0.30 | 10.6 | 1.8 | 0.05 |
| Comparative Example 3 | 22.0 | 6.2 | 0.30 | 10.6 | 1.8 | 0.05 |
| Comparative Example 4 | 22.0 | 8.1 | 0.10 | 10.6 | 1.8 | 0.05 |

TABLE 1-continued

| | | | | | | |
|---|---|---|---|---|---|---|
| Comparative Example 5 | 22.0 | 8.1 | 0.10 | 10.6 | 1.8 | 0.05 |
| Comparative Example 6 | 22.8 | 4.2 | 0.04 | 11.1 | 1.8 | 0.05 |

Note:
[1] The total amount of (CaO + $Na_2O$ + $K_2O$) existing as impurities in silica, kaolin, talc and alumina.

| | Pore-Forming Material | | | |
|---|---|---|---|---|
| No. | SD[1] [log(μm)] | Mode Diameter m50 (μm) | Amount (%) | \|M50-m50\| (μm) |
| Example 1 | 0.29 | 48.0 | 6.5 | 15.0 |
| Example 2 | 0.29 | 48.0 | 6.5 | 13.0 |
| Example 3 | 0.29 | 48.0 | 6.5 | 8.0 |
| Example 4 | 0.29 | 48.0 | 6.5 | 3.0 |
| Example 5 | 0.29 | 45.2 | 7.0 | 14.8 |
| Example 6 | 0.29 | 45.2 | 7.0 | 14.8 |
| Example 7 | 0.29 | 48.0 | 6.5 | 18.0 |
| Example 8 | 0.29 | 48.0 | 6.5 | 18.0 |
| Example 9 | 0.29 | 45.2 | 6.5 | 12.2 |
| Example 10 | 0.29 | 48.0 | 6.5 | 3.0 |
| Example 11 | 0.29 | 48.0 | 6.5 | 3.0 |
| Example 12 | 0.29 | 48.0 | 6.5 | 3.0 |
| Example 13 | 0.29 | 48.0 | 6.5 | 3.0 |
| Example 14 | 0.28 | 48.0 | 8.5 | 3.0 |
| Example 15 | 0.28 | 48.0 | 8.5 | 3.0 |
| Example 16 | 0.28 | 48.0 | 7.0 | 12.0 |
| Example 17 | 0.28 | 48.0 | 7.0 | 12.0 |
| Example 18 | 0.28 | 48.0 | 7.0 | 12.0 |
| Example 19 | 0.28 | 48.0 | 7.0 | 12.0 |
| Example 20 | 0.29 | 48.0 | 5.0 | 13.0 |
| Example 21 | 0.29 | 48.0 | 4.5 | 10.0 |
| Example 22 | 0.29 | 48.0 | 5.0 | 8.0 |
| Example 23 | 0.29 | 48.0 | 4.5 | 3.0 |
| Example 24 | 0.29 | 48.0 | 4.5 | 3.0 |
| Example 25 | 0.29 | 48.0 | 4.5 | 3.0 |
| Example 26 | 0.29 | 48.0 | 4.5 | 3.0 |
| Example 27 | 0.29 | 48.0 | 6.5 | 15.0 |
| Example 28 | 0.29 | 48.0 | 6.5 | 8.0 |
| Example 29 | 0.29 | 48.0 | 6.5 | 3.0 |
| Example 30 | 0.29 | 48.0 | 5.0 | 8.0 |
| Example 31 | 0.29 | 48.0 | 4.5 | 3.0 |
| Comparative Example 1 | 0.56 | 48.0 | 6.5 | 28.0 |
| Comparative Example 2 | 0.56 | 48.0 | 6.5 | 22.0 |
| Comparative Example 3 | 0.56 | 44.2 | 6.5 | 4.2 |
| Comparative Example 4 | 0.56 | 44.2 | 6.5 | 4.2 |
| Comparative Example 5 | 0.29 | 48.0 | 8.5 | 3.0 |
| Comparative Example 6 | 0.29 | 45.2 | 7.0 | 17.8 |

TABLE 2

| | Pore Size Distribution | | | | |
|---|---|---|---|---|---|
| | Total Pore Volume | Porosity | Average Pore Size | Percentage of Pore Volume (%) | |
| No. | (cm³/g) | (%) | (μm) | <10 μm | >50 μm |
| Example 1 | 0.520 | 56.7 | 23.8 | 6.0 | 13 |
| Example 2 | 0.545 | 57.9 | 24.9 | 5.0 | 11 |
| Example 3 | 0.568 | 58.9 | 26.6 | 4.2 | 12 |
| Example 4 | 0.589 | 59.7 | 27.5 | 4.5 | 13 |
| Example 5 | 0.633 | 61.5 | 27.9 | 3.9 | 17 |
| Example 6 | 0.675 | 63.0 | 28.8 | 3.5 | 15 |
| Example 7 | 0.524 | 56.9 | 23.8 | 6.0 | 12 |
| Example 8 | 0.501 | 55.8 | 23.8 | 5.9 | 12 |
| Example 9 | 0.520 | 56.7 | 23.8 | 6.0 | 11 |
| Example 10 | 0.580 | 59.4 | 27.5 | 4.5 | 13 |
| Example 11 | 0.585 | 59.6 | 27.5 | 4.5 | 13 |

TABLE 2-continued

| | | | | | |
|---|---|---|---|---|---|
| Example 12 | 0.586 | 59.6 | 27.5 | 4.5 | 13 |
| Example 13 | 0.586 | 59.6 | 27.5 | 4.5 | 13 |
| Example 14 | 0.739 | 65.1 | 30.0 | 3.5 | 24 |
| Example 15 | 0.741 | 65.1 | 30.0 | 3.5 | 24 |
| Example 16 | 0.679 | 63.1 | 28.8 | 3.5 | 17 |
| Example 17 | 0.679 | 63.1 | 28.8 | 3.5 | 17 |
| Example 18 | 0.679 | 63.1 | 28.8 | 3.5 | 17 |
| Example 19 | 0.679 | 63.1 | 28.8 | 3.5 | 17 |
| Example 20 | 0.391 | 49.6 | 23.4 | 7.0 | 16 |
| Example 21 | 0.355 | 47.2 | 23.4 | 7.0 | 16 |
| Example 22 | 0.395 | 49.9 | 23.4 | 6.0 | 15 |
| Example 23 | 0.359 | 47.5 | 23.4 | 6.0 | 15 |
| Example 24 | 0.359 | 47.5 | 23.4 | 6.0 | 15 |
| Example 25 | 0.359 | 47.5 | 23.4 | 6.0 | 15 |
| Example 26 | 0.359 | 47.5 | 23.4 | 6.0 | 15 |
| Example 27 | 0.520 | 56.7 | 23.8 | 6.0 | 13 |
| Example 28 | 0.568 | 58.9 | 26.6 | 4.2 | 12 |
| Example 29 | 0.580 | 59.4 | 27.5 | 4.5 | 13 |
| Example 30 | 0.395 | 49.9 | 23.4 | 6.0 | 15 |
| Example 31 | 0.359 | 47.5 | 23.4 | 6.0 | 15 |
| Comparative Example 1 | 0.600 | 60.2 | 19.0 | 12.0 | 8 |
| Comparative Example 2 | 0.680 | 63.1 | 39.0 | 15.0 | 34 |
| Comparative Example 3 | 0.533 | 57.3 | 24.0 | 14.0 | 8 |
| Comparative Example 4 | 0.640 | 61.7 | 36.0 | 2.0 | 30 |
| Comparative Example 5 | 0.685 | 63.3 | 30.0 | 10.0 | 26 |
| Comparative Example 6 | 0.633 | 61.5 | 27.9 | 3.9 | 17 |

| No. | Pore Size Distribution: Volume Percentage of Pores of 100 μm or More (%) | Pore Size Distribution: Pore Size Distribution Deviation σ | Honeycomb Structure: Wall Thickness (mm) | Honeycomb Structure: Cell Density (cells/cm$^2$) |
|---|---|---|---|---|
| Example 1 | 1.5 | 0.41 | 0.30 | 39 |
| Example 2 | 1.5 | 0.35 | 0.30 | 39 |
| Example 3 | 2.0 | 0.38 | 0.30 | 39 |
| Example 4 | 2.0 | 0.40 | 0.30 | 39 |
| Example 5 | 2.5 | 0.45 | 0.30 | 39 |
| Example 6 | 3.0 | 0.44 | 0.30 | 39 |
| Example 7 | 1.5 | 0.38 | 0.30 | 39 |
| Example 8 | 1.5 | 0.37 | 0.30 | 39 |
| Example 9 | 1.5 | 0.36 | 0.28 | 36 |
| Example 10 | 2.0 | 0.34 | 0.28 | 36 |
| Example 11 | 2.0 | 0.33 | 0.30 | 39 |
| Example 12 | 2.0 | 0.34 | 0.28 | 36 |
| Example 13 | 2.0 | 0.34 | 0.25 | 31 |
| Example 14 | 4.5 | 0.45 | 0.30 | 39 |
| Example 15 | 5.0 | 0.44 | 0.28 | 36 |
| Example 16 | 3.0 | 0.43 | 0.28 | 36 |
| Example 17 | 3.0 | 0.43 | 0.25 | 31 |
| Example 18 | 3.0 | 0.43 | 0.20 | 23 |
| Example 19 | 3.0 | 0.43 | 0.18 | 20 |
| Example 20 | 2.0 | 0.45 | 0.30 | 39 |
| Example 21 | 2.0 | 0.42 | 0.30 | 39 |
| Example 22 | 2.0 | 0.39 | 0.30 | 39 |
| Example 23 | 2.0 | 0.37 | 0.30 | 39 |
| Example 24 | 2.0 | 0.37 | 0.25 | 31 |
| Example 25 | 2.0 | 0.37 | 0.20 | 23 |
| Example 26 | 2.0 | 0.37 | 0.18 | 20 |
| Example 27 | 1.5 | 0.41 | 0.33 | 41 |
| Example 28 | 2.0 | 0.38 | 0.33 | 41 |
| Example 29 | 2.0 | 0.34 | 0.33 | 41 |
| Example 30 | 2.0 | 0.39 | 0.33 | 41 |
| Example 31 | 2.0 | 0.37 | 0.33 | 41 |
| Comparative Example 1 | 1.0 | 0.52 | 0.30 | 40 |
| Comparative Example 2 | 11.0 | 0.67 | 0.30 | 40 |
| Comparative Example 3 | 2.0 | 0.54 | 0.28 | 36 |
| Comparative Example 4 | 12.0 | 0.61 | 0.28 | 36 |

TABLE 2-continued

| No. | | | | |
|---|---|---|---|---|
| Comparative Example 5 | 4.0 | 0.66 | 0.28 | 36 |
| Comparative Example 6 | 2.5 | 0.47 | 0.30 | 40 |

| No. | Amount of Crystals | | | CTE Between 20° C. and 800° C. ($\times 10^{-7}$/° C.) | Area Ratio of Pores |
|---|---|---|---|---|---|
| | Cordierite (%) | Spinel (%) | Cristobalite (%) | | |
| Example 1 | 91 | 4.0 | 4.5 | 7.0 | 65 |
| Example 2 | 91 | 4.0 | 4.5 | 7.0 | 61 |
| Example 3 | 91 | 4.0 | 4.5 | 7.0 | 60 |
| Example 4 | 91 | 4.0 | 4.5 | 7.0 | 61 |
| Example 5 | 91 | 4.0 | 4.5 | 7.0 | 59 |
| Example 6 | 91 | 4.0 | 4.5 | 7.0 | 60 |
| Example 7 | 90 | 3.5 | 4.5 | 9.0 | 64 |
| Example 8 | 91 | 3.5 | 4.5 | 6.0 | 68 |
| Example 9 | 91 | 4.0 | 4.5 | 6.5 | 55 |
| Example 10 | 91 | 4.0 | 4.5 | 6.5 | 54 |
| Example 11 | 91 | 4.0 | 4.5 | 8.0 | 41 |
| Example 12 | 91 | 4.0 | 4.5 | 8.0 | 42 |
| Example 13 | 91 | 4.0 | 4.5 | 8.0 | 40 |
| Example 14 | 91 | 4.0 | 4.5 | 6.5 | 59 |
| Example 15 | 91 | 4.0 | 4.5 | 6.5 | 60 |
| Example 16 | 91 | 4.0 | 4.5 | 6.5 | 57 |
| Example 17 | 91 | 4.0 | 4.5 | 6.5 | 58 |
| Example 18 | 91 | 4.0 | 4.5 | 6.5 | 58 |
| Example 19 | 91 | 4.0 | 4.5 | 6.5 | 58 |
| Example 20 | 91 | 3.5 | 4.5 | 6.0 | 68 |
| Example 21 | 91 | 3.5 | 4.5 | 6.0 | 69 |
| Example 22 | 91 | 3.5 | 4.5 | 6.0 | 39 |
| Example 23 | 91 | 3.5 | 4.5 | 6.0 | 43 |
| Example 24 | 91 | 3.5 | 4.5 | 6.0 | 41 |
| Example 25 | 91 | 3.5 | 4.5 | 6.0 | 41 |
| Example 26 | 91 | 3.5 | 4.5 | 6.0 | 41 |
| Example 27 | 91 | 4.0 | 4.5 | 7.0 | 65 |
| Example 28 | 91 | 4.0 | 4.5 | 7.0 | 60 |
| Example 29 | 91 | 4.0 | 4.5 | 6.5 | 54 |
| Example 30 | 91 | 3.5 | 4.5 | 6.0 | 39 |
| Example 31 | 91 | 3.5 | 4.5 | 6.0 | 43 |
| Comparative Example 1 | 91 | 4.0 | 5.0 | 6.5 | 70 |
| Comparative Example 2 | 91 | 4.0 | 5.0 | 6.5 | 70 |
| Comparative Example 3 | 91 | 4.0 | 5.0 | 6.5 | 65 |
| Comparative Example 4 | 91 | 4.0 | 5.0 | 6.5 | 68 |
| Comparative Example 5 | 96 | 1.5 | 0.5 | 6.5 | 95 |
| Comparative Example 6 | 91 | 4.0 | 4.5 | 7.0 | 75 |

| No. | Evaluation Results | | | | | | |
|---|---|---|---|---|---|---|---|
| | Air Permeability ($\times 10^{-12}$ m$^2$) | | Pressure Loss by Soot Capturing (kPa) | | Isostatic Strength (MPa) | | Dimensional Accuracy |
| Example 1 | 4.9 | Good | 1.4 | Good | 2.3 | Excellent | Excellent |
| Example 2 | 5.1 | Excellent | 1.5 | Good | 2.1 | Excellent | Excellent |
| Example 3 | 5.0 | Excellent | 1.3 | Good | 2.0 | Excellent | Excellent |
| Example 4 | 5.1 | Excellent | 1.3 | Good | 2.0 | Excellent | Excellent |
| Example 5 | 4.0 | Good | 1.5 | Good | 1.8 | Good | Excellent |
| Example 6 | 4.4 | Good | 1.4 | Good | 1.7 | Good | Excellent |
| Example 7 | 5.9 | Excellent | 1.4 | Good | 1.9 | Good | Good |
| Example 8 | 6.0 | Excellent | 1.3 | Good | 1.8 | Good | Good |
| Example 9 | 5.6 | Excellent | 1.1 | Excellent | 2.4 | Excellent | Excellent |
| Example 10 | 5.8 | Excellent | 1.0 | Excellent | 2.0 | Excellent | Excellent |
| Example 11 | 6.0 | Excellent | 1.2 | Excellent | 2.2 | Excellent | Excellent |
| Example 12 | 6.1 | Excellent | 1.0 | Excellent | 2.0 | Excellent | Excellent |
| Example 13 | 6.1 | Excellent | 0.9 | Excellent | 2.1 | Excellent | Excellent |
| Example 14 | 4.0 | Good | 1.4 | Good | 1.5 | Good | Excellent |
| Example 15 | 4.7 | Good | 1.2 | Excellent | 1.6 | Good | Excellent |
| Example 16 | 5.0 | Excellent | 1.0 | Excellent | 1.8 | Good | Excellent |
| Example 17 | 5.0 | Excellent | 0.9 | Excellent | 1.9 | Excellent | Excellent |
| Example 18 | 5.1 | Excellent | 0.8 | Excellent | 1.7 | Good | Excellent |
| Example 19 | 5.2 | Excellent | 0.7 | Excellent | 1.4 | Good | Excellent |
| Example 20 | 4.0 | Good | 1.5 | Good | 2.0 | Excellent | Good |

TABLE 2-continued

| | | | | | | |
|---|---|---|---|---|---|---|
| Example 21 | 4.5 | Good | 1.5 | Good | 2.2 | Excellent | Good |
| Example 22 | 5.1 | Excellent | 1.4 | Good | 2.1 | Excellent | Good |
| Example 23 | 5.4 | Excellent | 1.4 | Good | 2.3 | Excellent | Good |
| Example 24 | 5.6 | Excellent | 1.2 | Excellent | 2.5 | Excellent | Good |
| Example 25 | 5.7 | Excellent | 1.0 | Excellent | 1.8 | Good | Good |
| Example 26 | 5.8 | Excellent | 0.9 | Excellent | 1.5 | Good | Good |
| Example 27 | 4.5 | Good | 1.5 | Good | 2.4 | Excellent | Excellent |
| Example 28 | 4.9 | Good | 1.5 | Good | 2.3 | Excellent | Excellent |
| Example 29 | 5.2 | Excellent | 1.3 | Good | 2.4 | Excellent | Excellent |
| Example 30 | 4.9 | Good | 1.5 | Good | 2.3 | Excellent | Good |
| Example 31 | 5.3 | Excellent | 1.5 | Good | 2.5 | Excellent | Good |
| Comparative Example 1 | 3.1 | Poor | 2.0 | Poor | 1.1 | Good | Good |
| Comparative Example 2 | 1.9 | Poor | 1.5 | Good | 0.6 | Poor | Good |
| Comparative Example 3 | 2.8 | Poor | 1.8 | Poor | 1.0 | Good | Good |
| Comparative Example 4 | 2.1 | Poor | 1.5 | Good | 0.5 | Poor | Good |
| Comparative Example 5 | 3.5 | Poor | 1.8 | Poor | 1.2 | Good | Poor |
| Comparative Example 6 | 3.8 | Poor | 1.7 | Poor | 1.3 | Good | Good |

It is clear from Table 2 that the ceramic honeycomb filters of Examples 1-31 within the present invention have smaller pressure loss while keeping enough strength in use. On the other hand, the ceramic honeycomb filters of Comparative Examples 1-6 have low air permeability and poor pressure loss or strength, failing to meet the requirements of pressure loss and strength.

EFFECT OF THE INVENTION

Because the ceramic honeycomb structure of the present invention keeps enough strength during use, with smaller pressure loss, it is suitable for large ceramic honeycomb filters of more than 200 mm in outer diameter.

What is claimed is:

1. A ceramic honeycomb structure having a large number of flow paths defined by porous cell walls having porosity of 45-68% and an average pore size of 15-35 μm, said ceramic honeycomb structure having a thermal expansion coefficient of $3 \times 10^{-7}/°C$. to $13 \times 10^{-7}/°C$. between 20° C. and 800° C., and pores meeting the following conditions:
the volume of pores having diameters of more than 50 μm being more than 10% and 25% or less of the total pore volume;
the volume of pores having diameters of 100 μm or more being 1-8% of the total pore volume;
the volume of pores having diameters of less than 10 μm being 3-10% of the total pore volume; and
said pores having a pore size distribution deviation $\sigma[=\log(D_{20})-\log(D_{80})]$ of 0.45 or less, wherein $D_{20}$ represents a pore size (μm) at a pore volume corresponding to 20% of the total pore volume, and $D_{80}$ represents a pore size (μm) at a pore volume corresponding to 80% of the total pore volume, in a curve showing the relation between a pore size and a cumulative pore volume obtained by accumulating a pore volume from the maximum pore size to a particular pore size, and $D_{80} < D_{20}$.

2. The ceramic honeycomb structure according to claim 1, wherein said porous cell walls have air permeability of $4 \times 10^{-12}$ m$^2$ to $9 \times 10^{-12}$ m$^2$.

3. The ceramic honeycomb structure according to claim 1, having an isostatic strength of 1 MPa or more.

4. The ceramic honeycomb structure according to claim 1, wherein said porous cell walls have a thickness of 0.2-0.3 mm and a cell density of 23-39 cells/cm$^2$.

5. The ceramic honeycomb structure according to claim 1, which suffers pressure loss of 1.2 kPa or less, when capturing 2 g/liter of soot at a flow rate of 10 Nm$^3$/min with a ceramic honeycomb filter obtained by alternately plugging flow path ends of a ceramic honeycomb structure of 266.7 mm in diameter and 304.8 mm in length having a cell density of 36.4 cells/cm$^2$ and a cell wall thickness of 0.28 mm in a checkerboard pattern.

6. The ceramic honeycomb structure according to claim 1, wherein a main component of its crystal phase is cordierite, containing 3-6% of spinel and 1-8% of cristobalite.

7. The ceramic honeycomb structure according to claim 1, wherein said porosity is more than 58% and 66% or less.

8. The ceramic honeycomb structure according to claim 1, wherein said average pore size is 20-34 μm.

9. A method for producing a ceramic honeycomb structure having a large number of flow paths defined by porous cell walls by extrusion-molding a moldable material comprising a cordierite-forming material and a pore-forming material, and sintering the resultant molding,
said cordierite-forming material containing 10-20% of silica;
said silica being in the form of powder having a mode diameter of 30-60 μm, particles having particle sizes of 20 μm or less being 2-10%, particles having particle sizes of 100 μm or more being 2-10%, and particles having particle sizes of 200 μm or more being 1% or less;
said particles having a particle size distribution deviation SD $[=\log(d_{80})-\log(d_{20})]$ of 0.5 or less, wherein $d_{20}$ represents a particle size (μm) corresponding to a cumulative volume of 20%, and $d_{80}$ represents a particle size (μm) corresponding to a cumulative volume of 80%, in a curve showing the relation between a particle size and a cumulative particle volume expressed by the volume percentage of particles having a particular particle size or less, and meeting $d_{20} < d_{80}$; and wherein the method produces a ceramic honeycomb structure according to claim 1.

10. The method for producing a ceramic honeycomb structure according to claim 9, wherein said pore-forming material is 1-15% based on said cordierite-forming material, and wherein said pore-forming material is in the form of powder having a mode diameter of 30-70 μm and a particle size distribution deviation SD of 0.5 or less.

11. The method for producing a ceramic honeycomb structure according to claim 9, wherein the absolute value of the difference between the mode diameter M50 of said silica particles and the mode diameter m50 of said pore-forming material particles, |M50-m50|, is 15 μm or less.

12. The method for producing a ceramic honeycomb structure according to claim 9, wherein said silica particles have sphericity of 0.5 or more.

13. The method for producing a ceramic honeycomb structure according to claim 9, wherein said pore-forming material is more than 6% and 15% or less, based on said cordierite-forming material.

* * * * *